United States Patent
Kim

(10) Patent No.: US 6,922,168 B2
(45) Date of Patent: Jul. 26, 2005

(54) METHOD FOR OBTAINING GPS SIGNAL FOR USER TERMINAL

(75) Inventor: Jae-Hyoung Kim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/998,777

(22) Filed: Nov. 29, 2004

(65) Prior Publication Data
US 2005/0122261 A1 Jun. 9, 2005

(30) Foreign Application Priority Data
Dec. 9, 2003 (KR) .................................. 10-2003-0089092

(51) Int. Cl.⁷ .............................................. H04B 7/185
(52) U.S. Cl. .................................................. 342/357.15
(58) Field of Search ....................... 342/357.02, 357.06, 342/357.11, 357.15; 701/207, 213

(56) References Cited

U.S. PATENT DOCUMENTS 6,473,030 B1 * 10/2002 McBurney et al. .... 342/357.03
6,633,255 B2 * 10/2003 Krasner ................. 342/357.12
6,724,807 B1 * 4/2004 Krasner et al. ............. 375/143

* cited by examiner

Primary Examiner—Dao Phan
(74) Attorney, Agent, or Firm—Dilworth & Barrese LLP

(57) ABSTRACT

Disclosed is a method for obtaining a GPS signal by a user terminal operating in a time division duplex method, the user terminal receiving the GPS signal and a base station signal, the method includes setting a maximum window reception interval for attempting a GPS signal acquisition; setting within a frame an interval for attempting the GPS signal acquisition and attempting the GPS signal acquisition; exponentially increasing the time period for attempting the GPS signal acquisition and reattempting a GPS signal acquisition, when the GPS signal is not obtained in the set interval for the GPS signal acquisition; and ending the GPS signal acquisition attempts when the interval for the GPS signal acquisition is greater than or equal to the maximum window reception interval.

6 Claims, 5 Drawing Sheets

METHOD FOR OBTAINING GPS SIGNAL FOR USER TERMINAL

PRIORITY

This application claims priority to an application entitled "Method For Obtaining GPS Signal For User Terminal" filed in the Korean Intellectual Property Office on Dec. 9, 2003 and assigned Serial No. 2003-89092, the contents of which are incorporated herein by reference.

BACKGROUND OF THE INVENTION

1. Field of the Invention

The present invention relates to a user terminal, and more particularly to a method for obtaining a global positioning system (GPS) signal for a user terminal.

2. Description of the Related Art

Recently, an IEEE 802.16e standard has been actively developed, which supports a user terminal mobility with technology similar to the mobile Internet technology. The IEEE 802.16e standard is a standard expanded from the IEEE 802.16a standard, which is a fixed broadband wireless connection standard using a frequency band of 2 to 11 GHz. The existing IEEE 802.16a does not support the user terminal mobility, but the IEEE 802.16e supports a handoff (or handover) between base stations, roaming, and the user terminal mobility, similarly to the Global System for Mobile Communication (GSM), the general packet radio service (GPRS), and the code division multiple access (CD MA) systems. This IEEE 802.16e standard is predicted to be used for providing a backhaul or Internet access service to various service areas to which many subscribers belong and to metropolitan areas.

Further, with the development of mobile communication technology, users of user terminals (UTs) have demanded not only a communication service but also various supplementary services that are based on position information. Since user terminals are portable and can communicate wirelessly with other user terminals, carriers can provide users of the user terminals with various supplementary services by means of the position information. Recent supplementary services using terminal position information widely provided by carriers include a traffic information service, a map downloading service, a position information service, a weather information service, an emergency service, a vehicle navigation service, etc.

As described above, various supplementary services provided on the basis of the position information of the user terminals are referred to as location-based services. Recently, in order to use location-based services, hardware for receiving GPS signals is provided within the user terminals. However, the IEEE 802.16e standard does not make reference to a GPS mode. The existing IEEE 802.16e standard does not include a description of a case in which a user terminal receives a GPS signal and a base station signal.

SUMMARY OF THE INVENTION

Accordingly, an object of the present invention is to provide a method for efficiently obtaining a GPS signal for a user terminal according to an IEEE 802.16e time division duplex, without collision and during an ongoing radio communication.

In order to accomplish the aforementioned object, according to one aspect of the present, there is provided a method for obtaining a GPS signal for a user terminal according to a time division duplex method, the user terminal receiving the GPS signal and a base station signal, the method including setting a maximum window reception interval for attempting a GPS signal acquisition; setting within a frame an interval for the GPS signal acquisition and attempting reception of the GPS signal; exponentially increasing the interval for the GPS signal acquisition and reattempting a GPS signal acquisition, when the GPS signal is not obtained in the set interval for the GPS signal acquisition; and ending the GPS signal acquisition attempts when the interval for the GPS signal acquisition is greater than or equal to the maximum window reception interval.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may obscure the subject matter of the present invention.

Figure 1:
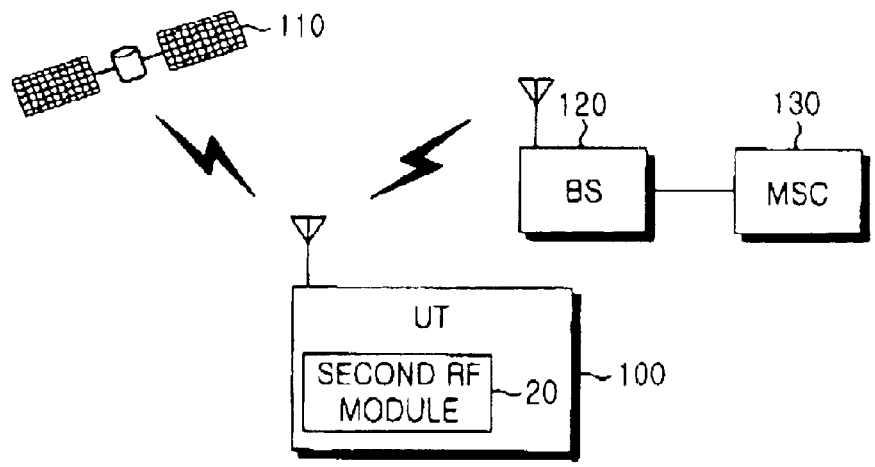
FIG. 1 is a block diagram showing a construction of a mobile communication system according to the present invention.

FIG. 1 is a block diagram showing a construction of a mobile communication system according to the present invention. As shown in FIG. 1, a user terminal (UT) 100 wirelessly communicates with a GPS satellite 110 and a base station (BS) 120, and the base station 120 is connected to a mobile switching center (MSC) 130.

The user terminal 100 is connected to the base station 120 through an air interface. When an incoming call for a user terminal in a corresponding service area is received from the mobile switching center 130, the base station 120 transmits the incoming call to a corresponding user terminal. In contrast, when an outgoing call is received from a user terminal, the base station 120 transmits the outgoing call to the mobile switching center 130. Further, the base station 120 performs the general call processing for calls such as voice calls, circuit calls, and packet calls.

Figure 2:
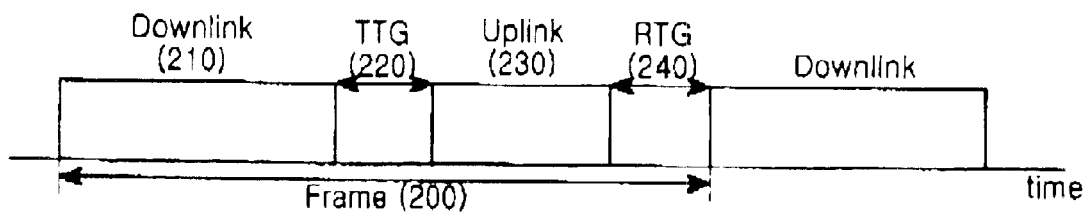
FIG. 2 is a diagram showing a structure of a TDD frame.

The mobile switching center 130 performs a call connection exchange function for processing incoming/outgoing requests for the user terminal 100, and a network interworking function with other mobile station centers. In such a mobile communication system, multiple access wireless communications between the base station 120 and the user terminal 100 is performed through the radio frequency (RF) channels that provide the physical routes to transmit the communication signals such as voice signals, data signals, and image signals. The user terminal 100 transmits/receives a frame according to a time division duplex (TDD) method of an IEEE 802.16e standard to/from the base station 120. Further, an uplink channel is used in the case in which the user terminal 100 attempts to make a call through the base station 120 or responds to a control message from the base station 120. In contrast, a downlink channel is used in the case in which the base station 120 transmits voice data or other data along with signal information to a predetermined user terminal 100. Such an uplink channel and a downlink channel are contained in one wireless channel according to a TDD method of the IEEE 802.16e standard. One wireless channel includes one uplink channel and one downlink channel. A connection method in the aforementioned mobile communication system is essential when two-way simultaneous data transmission is required, that is, when voice communication is required. FIG. 2 shows a structure of one frame a wireless channel.

FIG. 2 is a diagram showing a structure of a TDD frame. As shown in FIG. 2, one frame 200 includes a downlink channel 210 and an uplink channel 230 as described above. Further, each frame 200 includes a TX/RX (transmission/reception) transition gap (TTG) 220 and a RX/TX (reception/transmission) transition gap (RTG) 240.

As shown in FIG. 1, the user terminal 100 includes, in addition to an RF module for UT-BS communications (not shown), a second RF module 20 for receiving a GPS pseudo random number (PN) code from the GPS satellite 110. The GPS PN code contains positioning information used in a location-based service and a navigation service, etc. Recently the second RF module 20 for receiving a GPS signal has been provided within the user terminal 100.

A civilian GPS employs an L1 carrier of 1.57542 GHz and uses a coarse acquisition (C/A) code as a pseudo random number (PN). Herein, the coarse acquisition code has a period of 1 ms and repeats 20 times.

When a GPS receiver obtains the coarse acquisition code, the GPS receiver can be synchronized with satellite 110 and can obtain a pseudo range by means of this synchronization information. The GPS receiver can determine its own position.

However, the frame according to the TDD method of the IEEE 802.16e standard shown in FIG. 2 does not includes an interval for receiving or obtaining the GPS PN code.

In the present invention, when the user terminal 100 must obtain the GPS PN code, an acquisition interval is arranged in each frame and the GPS PN code acquisition interval is exponentially increased, so that the GPS PN code can be obtained within a specified period of time up to a maximum window frame interval.

Figure 3:
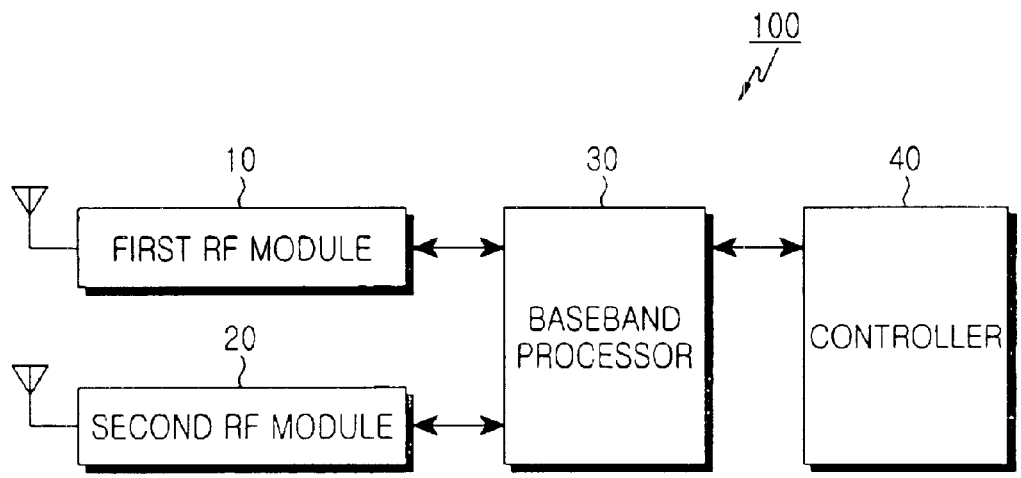
FIG. 3 is a block diagram showing a construction of a user terminal according to one embodiment of the present invention.

FIG. 3 is a block diagram showing the construction of the user terminal 100 according to one embodiment of the present invention. As shown in FIG. 3, the user terminal 100 includes a first RF module 10 for radio communication with the base station 120, the second RF module 20 for radio communication with the GPS satellite 110, a baseband processor 30, and a controller 40. The baseband processor 30 performs baseband-processing for signals from the RF modules 10 and 20 or the controller 40. When the GPS PN code must be obtained, the controller 40 assigns the GPS PN code acquisition interval to the frame. An operation of the controller 40 will be described in detail with reference to FIG. 4.

Figure 4:
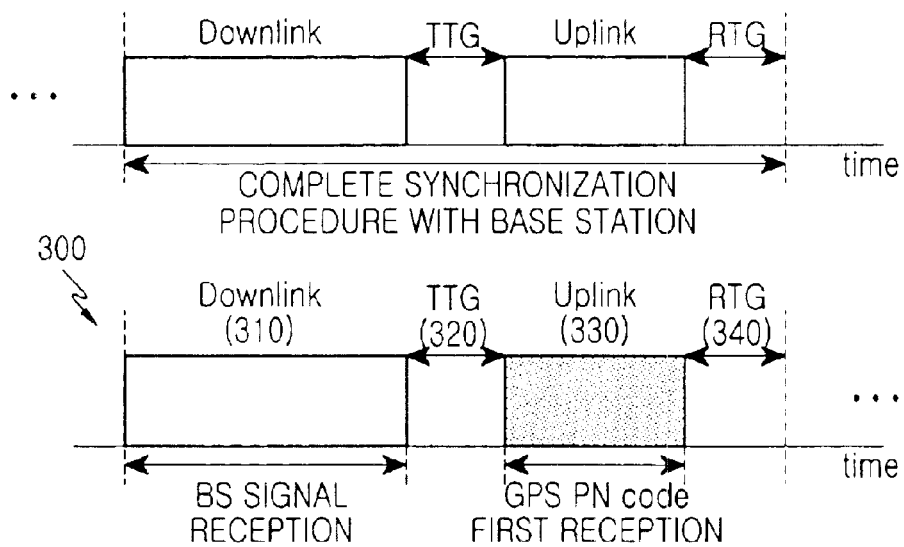
FIG. 4 is a diagram showing a structure of a TDD frame according to the first reception for a GPS PN code according to the present invention.

FIG. 4 is a diagram showing a structure of a TDD frame according to the first reception of a GPS PN code according to the present invention. The upper part of FIG. 4 shows a structure of the existing frame, and when one frame has a time period of 5 ms, a ratio between a downlink interval and an uplink interval is 13:9. The uplink interval has a time period of 2.03 ms, and the TX/RX transition gap and the RX/TX transition gap each have a time period of 20.14 $\mu$sec. The lower part of FIG. 4 shows a structure of the TDD frame according to the first reception of the GPS PN code according to the present invention. As shown in FIG. 4, a data frame 300 as one unit includes a downlink channel interval 310, a TX/RX transition gap 320, a GPS signal reception interval 330 for the GPS PN code reception, and a RX/TX transition gap 340. The GPS signal reception interval 330 according to the present invention substitutes for the existing uplink channel interval 330.

When a user orders a GPS mode, the controller 40 in the user terminal 100, which is in a standby state after completing a synchronization procedure with the base station 120, receives a signal from the base station 120 in the downlink channel interval 310 and receives a GPS signal in the GPS signal reception interval 330, which is next to the TX/RX transition gap 320 and has been substituted for the uplink interval. Since the GPS signal reception interval 330 has the same time period of 2.03 ms as that of the uplink interval as described above, the coarse acquisition code with a period of 1 ms can be received twice within one sequence.

The controller 40 replaces the uplink interval 330 with the GPS signal reception interval in one frame and receives a GPS signal in the GPS signal reception interval. When the GPS PN code is not obtained through such an initial attempt, the controller 40 attempts a second acquisition of the GPS PN code. After the initial attempt of the GPS PN code acquisition, in the immediate next frame, since the base station 120 may also transmit a short message or a received call to the user terminal 100, or the user terminal 100 may also request communication with the base station 120, a general communication must be performed between the base station 120 and the user terminal 100. After such general communication, the controller 40 again tries a GPS PN code acquisition. Herein, FIG. 5 shows a structure of a data frame when the controller 40 makes a second attempt for the GPS PN code acquisition.

Figure 5:
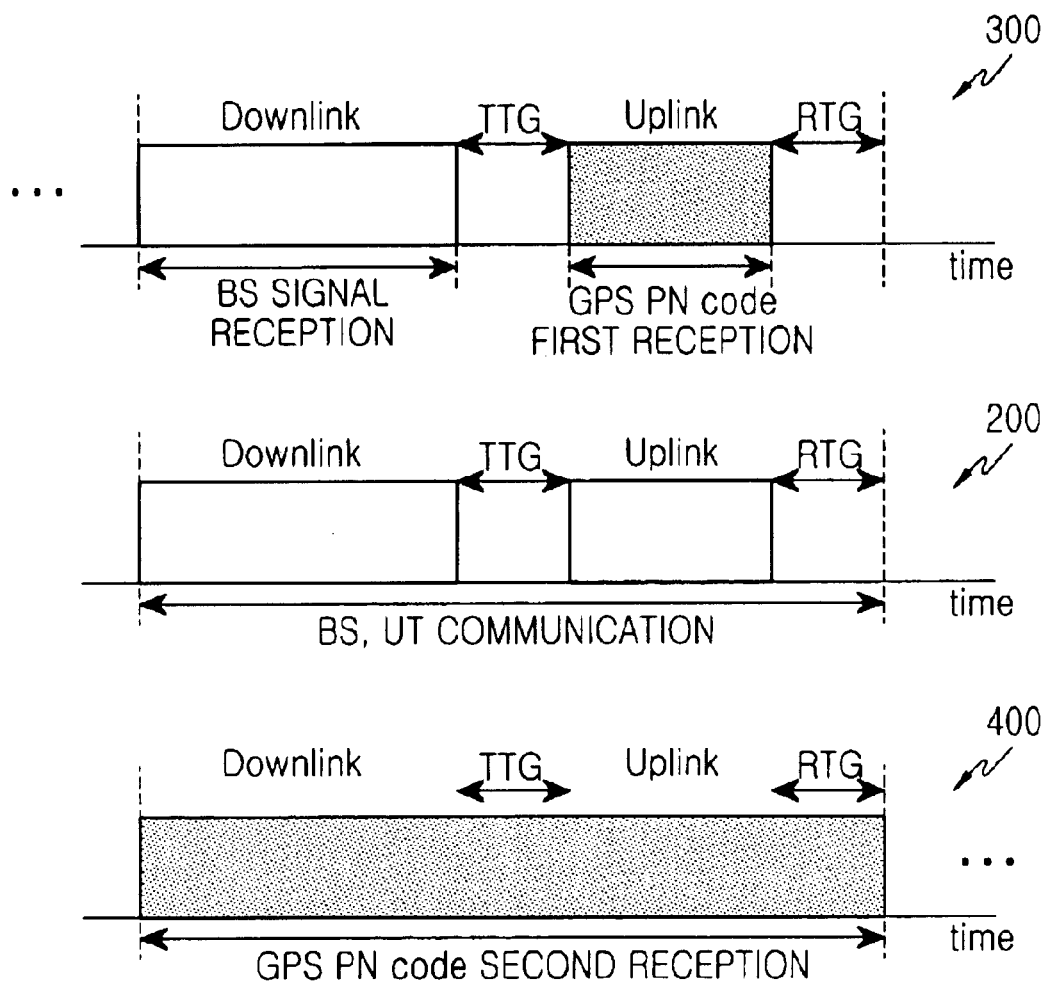
FIG. 5 is a diagram showing structure of a TDD frame for the second reception for a GPS PN code.

FIG. 5 is a diagram showing the structure of a TDD frame for the second reception of the GPS PN code. The upper part of FIG. 5 shows a structure of the TDD frame 300 for the first reception of the GPS PN code, the central part of FIG. 5 shows a structure of the existing frame 200 for general communication, and the lower part of FIG. 5 shows a structure of a TDD frame for the second reception of the GPS PN code. As shown in the lower part of FIG. 5, an entire data frame 400 as a unit is used for the GPS PN code.

That is, the controller 40 performs an acquisition by the frame from the second attempt. In the present invention, since an exponentially increased window is constructed for the GPS PN code reception in the frame, a frame interval T for the GPS PN code acquisition is set by Equation (1)

$$\text{frame length} * 2^{(\text{count value}-1)} \qquad (1)$$

In the second attempt, a frame interval has a value of 5 ms*$2^{(0)}$, that is, 5 ms. For the 5 ms, the coarse acquisition code can be received five times during one sequence. In other words, since the coarse acquisition code is received within a period of 1 ms, the coarse acquisition code can be received five times in the sequence. Further, when the GPS PN code has not been obtained through this second attempt, the controller 40 attempts for a third time for the GPS PN code acquisition. After the second attempt of the GPS PN code acquisition, the controller 40 performs general communication with the base station 120 in the immediate next frame. After performing the general communication, the controller 40 makes the third attempt for the GPS PN code acquisition. As the acquisition attempt is performed, the counter value increases and a GPS signal reception interval increases. A control flow of the controller 40 for obtaining the GPS PN code will be described with reference to FIGS. 6 and 7.

Figure 6:
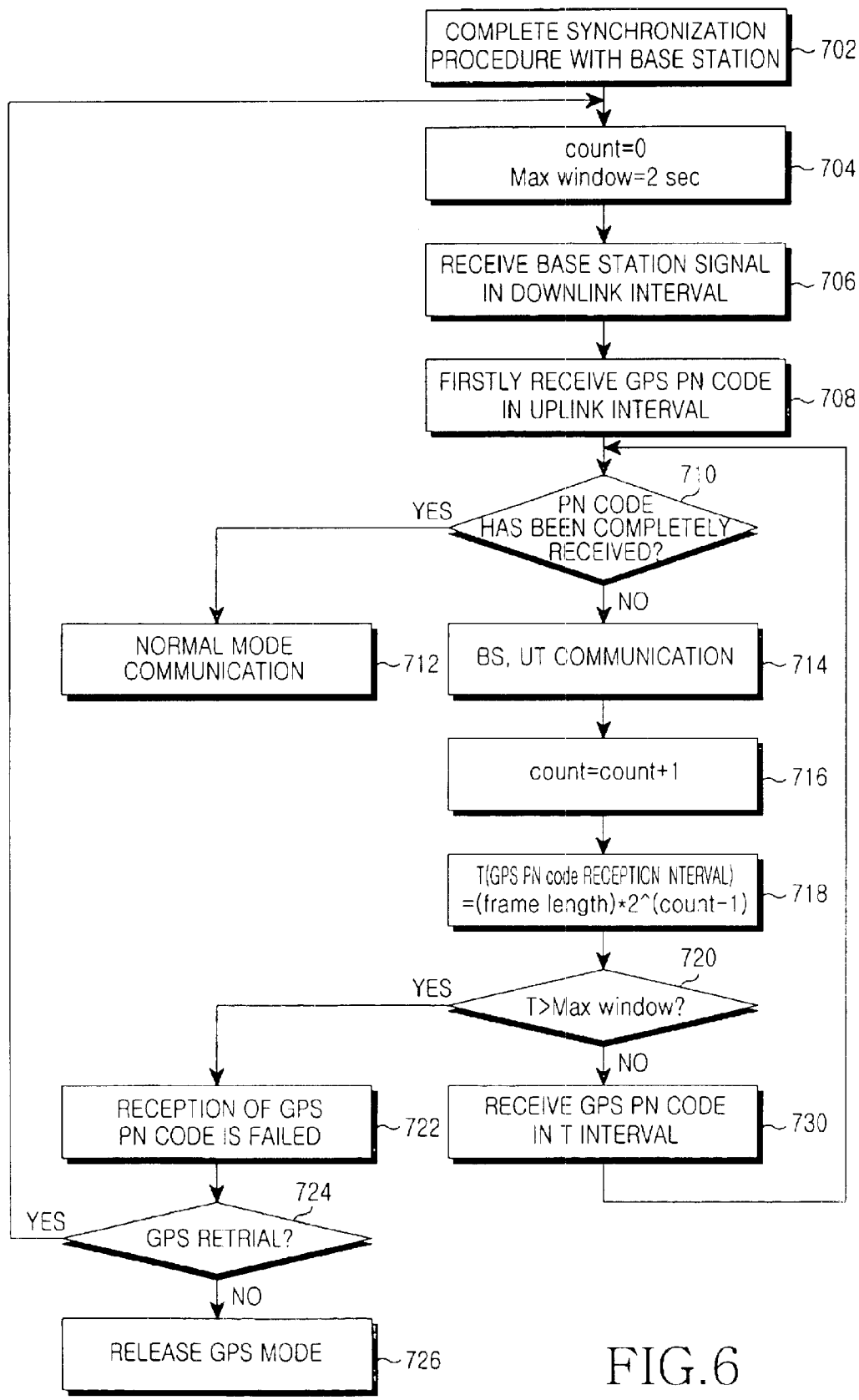
FIG. 6 is a flowchart illustrating a method for obtaining a GPS signal for a time division duplex user terminal according to the present invention.
Figure 7:
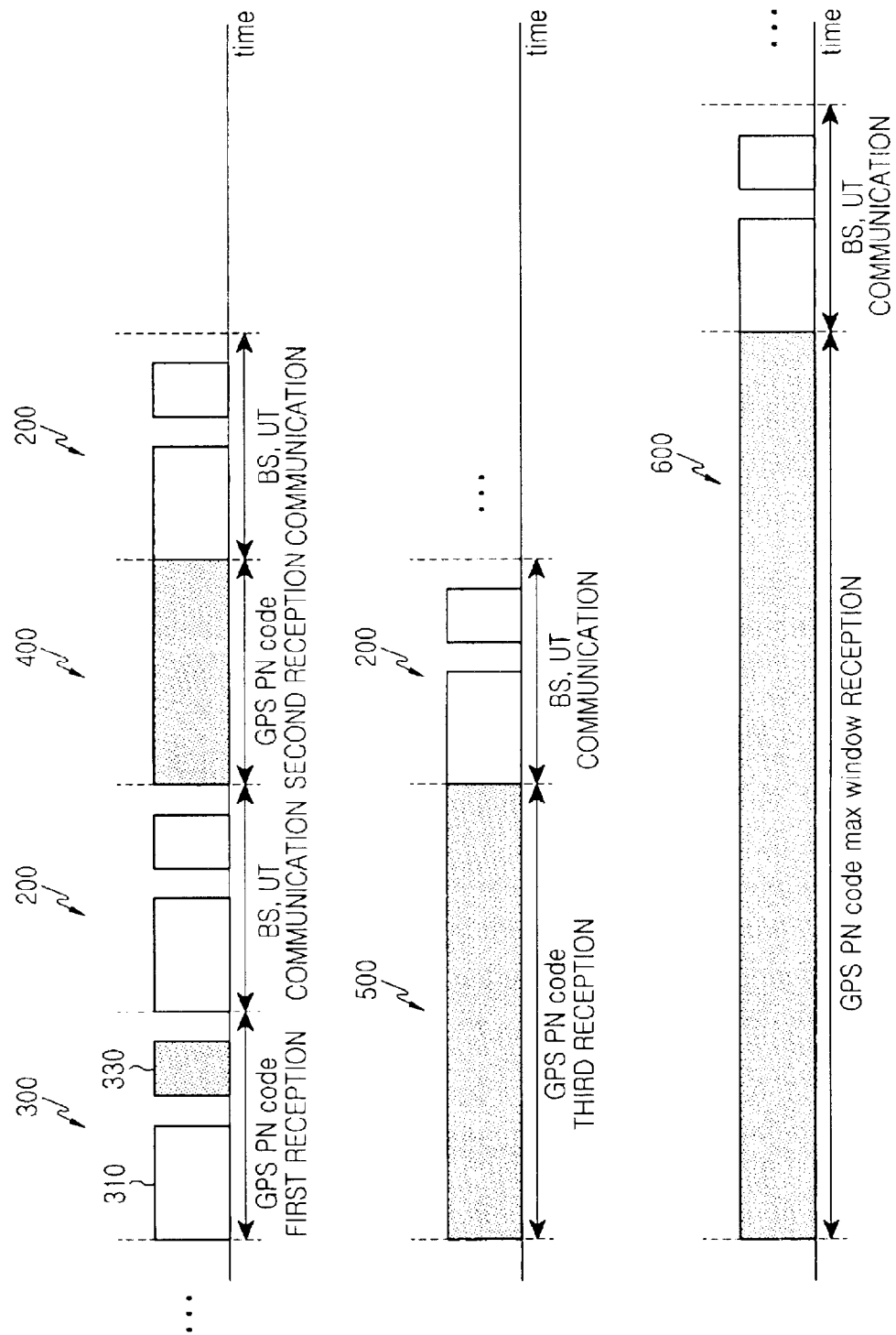
FIG. 7 is a diagram showing a structure of a TDD frame up to a maximum reception for a GPS PN code according to the present invention.

FIG. 6 is a flowchart illustrating a method for obtaining a GPS signal for a time division duplex user terminal according to the present invention, and FIG. 7 is a diagram showing a structure of a TDD frame up to a maximum window in a GPS PN code.

Referring to FIGS. 6 and 7, in step 702, the controller 40 in the user terminal 100 completes the synchronization procedure with the base station 120. That is, the controller 40 is synchronized with the base station 120 for transmitting/receiving a signal to/from the base station 120. Next, in step 704, the controller 40 resets a count value to zero and sets a maximum reception window to two seconds. Setting the maximum reception window to two seconds means that a frame interval for obtaining the GPS PN code may have a maximum value of two seconds. When it is assumed that one frame has a period of 5 ms, a maximum frame interval for obtaining the GPS PN code corresponds to 400 frames.

Next, in step 706, the controller 40 receives a base station signal in a downlink interval 310 of one frame 300 as shown in FIG. 7. Then, in step 708, the controller 40 first receives a GPS signal in a GPS signal reception interval 330 having been substituted for an uplink interval. Then, in step 710, the controller 40 determines whether or not the GPS PN code has been completely received. When the GPS PN code has been completely received, step 712 is performed. That is, the controller 40 communicates with the base station 120 in a normal mode. In contrast, when the first attempt for the GPS PN code acquisition fails, that is, the GPS PN code is not obtained, step 714 is performed. The controller 40 performs general communication with the base station 120 in a frame 200 next to the frame 300 as shown in FIG. 7 so that the base station 120 can transmit a short message or a received call to the user terminal 100, and the user terminal 100 can make a request for communication to the base station 120. Next, after performing the general communication with the base station 120, the controller 40 increases the count value by 1 in step 716 and determines a GPS PN code reception interval according to Equation (2) in step 718.

$$T(GPS\ PN\ \text{code reception interval}) = \text{frame length} * 2^{(count-1)} \quad (2)$$

In step 720, the controller 40 determines whether or not an obtained GPS PN code reception interval exceeds the maximum reception window. That is, the controller 40 determines whether or not the GPS PN code reception interval has exceeded the two seconds set in step 704. When the GPS PN code reception interval has not exceed the maximum reception window, step 730 is performed. That is, the controller 40 obtains or receives the GPS PN code for the GPS PN code reception interval. Then, step 710 is performed. Herein, when the maximum reception window has a value of two seconds and the GPS PN code has not been obtained, the controller 40 can reattempt the operation from step 714 to step 718, that is, an acquisition operation for the GPS PN code, up to a maximum of seventeen times. When the GPS PN code has not been obtained by the completion of the 17$^{th}$ attempt for obtaining the GPS PN code, the controller 40 determines that the GPS PN code reception has failed.

Meanwhile, from the result of the determination in step 720, when the GPS PN code reception interval has exceeded the two seconds set in step 704, step 722 is performed. That is, the controller 40 ends an operation for receiving the GPS PN code.

Further, the controller 40 informs a user of the end of operation for receiving the GPS PN code and can ask the user whether to reattempt to receive the GPS PN code in step 724.

In another embodiment of the present invention, the controller 40 can be set to make an attempt to receive a GPS PN code for a predetermined number of times and automatically make an attempt to receive the GPS PN code up to the predetermined number of times.

When it is not set to make a reattempt to receive the GPS PN code, the controller 40 releases a GPS mode in step 726. The controller 40 performs a general communication with the base station 120 in frames 200 next to reception intervals 330, 400, 500, and 600 of the GPS PN code as shown in FIG. 7 so that the base station 120 can transmit a short message or a received call to the user terminal 100, and the user terminal 100 can request a communication to the base station 120.

In the present invention, when a user terminal must obtain a GPS signal, a GPS signal acquisition interval is divided into a unit of a frame and the GPS signal acquisition interval is exponentially increased when the GPS signal acquisition has failed, to repeatedly attempt to obtain the GPS signal. Further, when a process for obtaining a GPS PN code in a user terminal according to the present invention is used, the synchronization with a GPS coarse acquisition code can be achieved without collision with a 802.16e communication method. In addition, this information is transmitted to a base station, so that position information can be used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for obtaining a global positioning system (GPS) signal by a user terminal operating in a time division duplex method, the user terminal receiving the GPS signal and a base station signal, the method comprising the steps of:

setting a maximum window reception interval for attempting a GPS signal acquisition;

setting within a frame an interval for attempting the GPS signal acquisition and attempting reception of the GPS signal;

exponentially increasing the interval for attempting the GPS signal acquisition and reattempting a GPS signal acquisition, when the GPS signal is not obtained in the set interval for the GPS signal acquisition; and ending the GPS signal acquisition attempts when the interval for the GPS signal acquisition is greater than or equal to the maximum window reception interval.

2. The method as claimed in claim 1, wherein the frame includes a downlink channel interval, a transmission/ reception (TX/RX) transition gap, a GPS signal reception interval for the GPS signal reception, and a reception/transmission (RX/TX) transition gap.

3. The method as claimed in claim 1, wherein the GPS signal is a GPS pseudo random number (PN) code.

4. The method as claimed in claim 3, wherein the GPS PN code is a coarse acquisition code.

5. The method as claimed in claim 1, wherein the maximum window reception interval is equal to two seconds.

6. The method as claimed in claim 1, wherein the interval for the GPS signal acquisition is calculated by $$T(GPS\ PN\ \text{code reception interval}) = \text{frame length} * 2^{(count-1)}$$

where count represents a repeated number of attempts to acquire a GPS signal.

* * * * *